Patented July 25, 1939

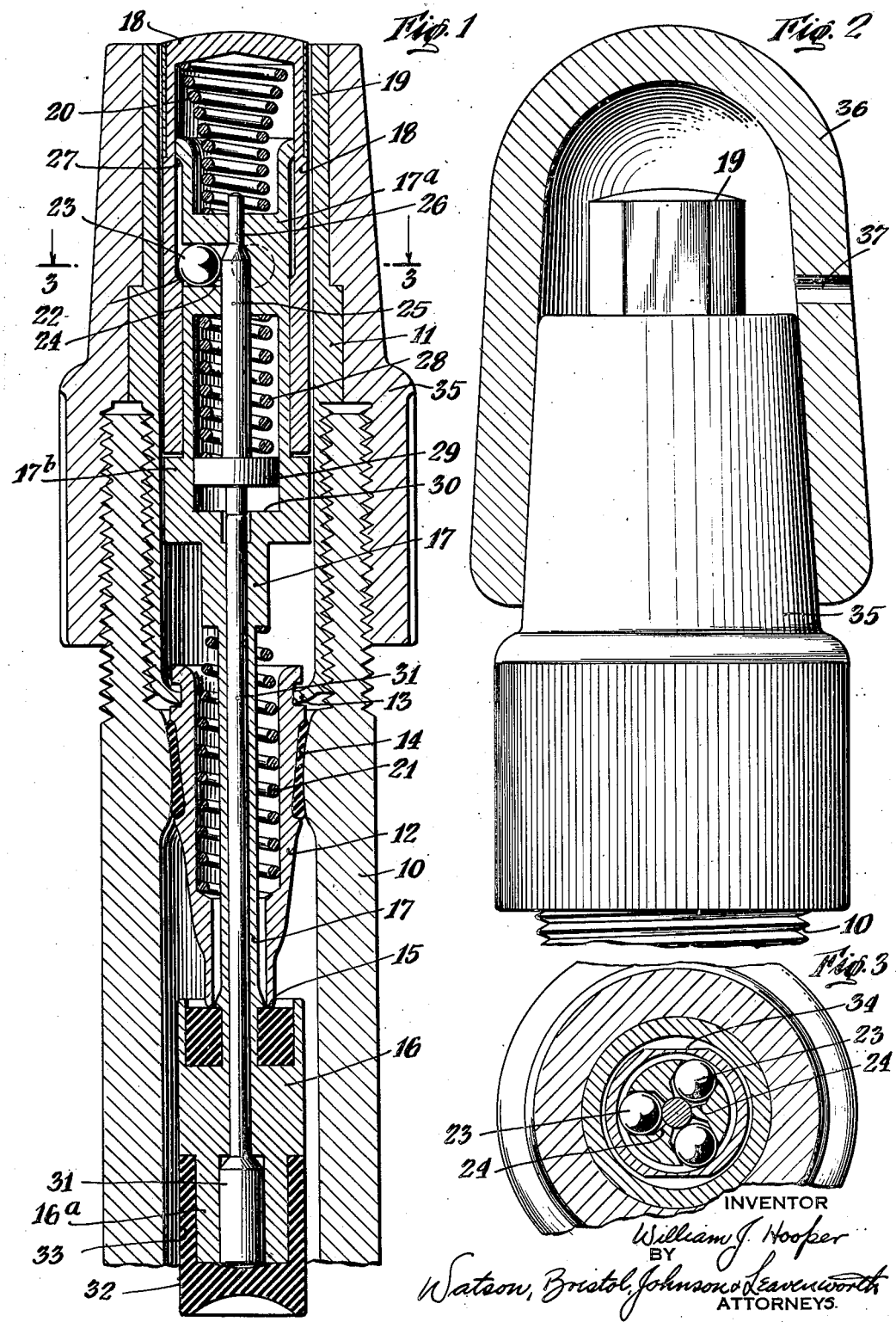

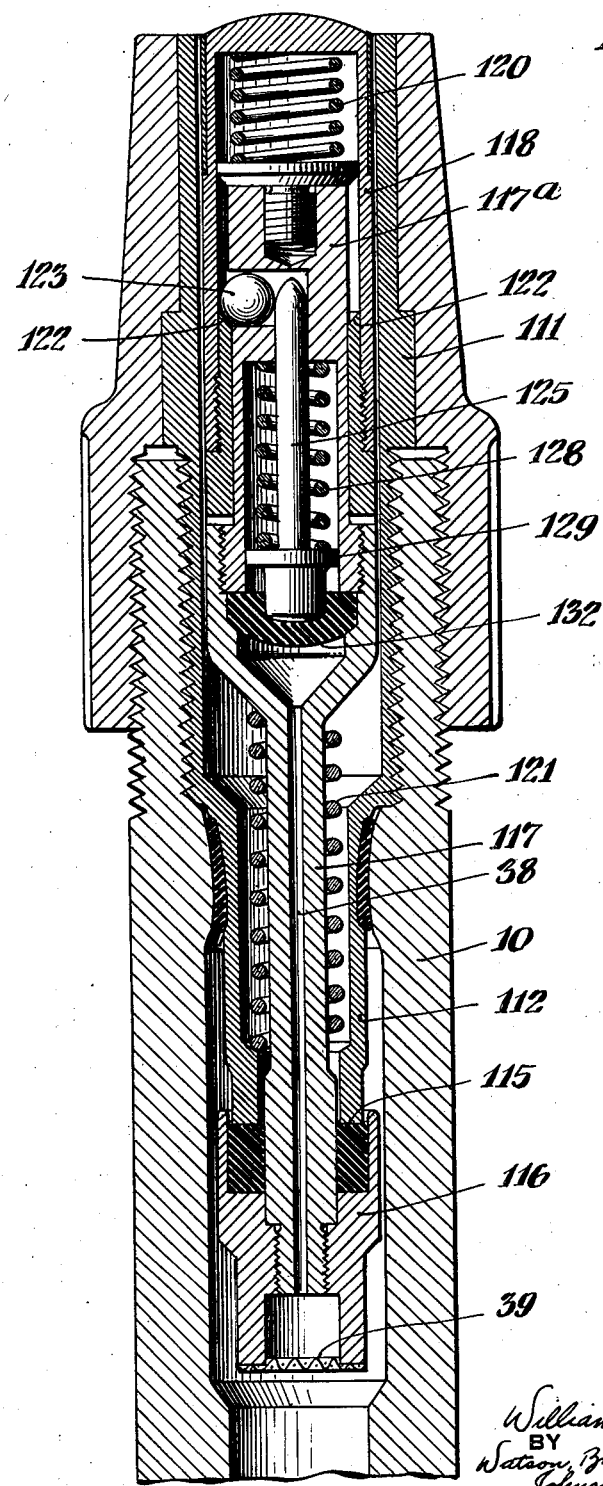

2,167,456

UNITED STATES PATENT OFFICE 2,167,456

PRESSURE SIGNAL

William J. Hooper, Elsah, Ill.

Application August 17, 1937, Serial No. 159,447

13 Claims. (Cl. 116—34)

This invention relates to low-pressure signals for fluid containing chambers, and is particularly useful for tires of motor cars and other vehicles.

A general object of the invention is to provide a low-pressure signal having novel features of construction affording a more convenient and more useful device than has heretofore been available for similar purposes.

More particularly, objects of the invention are to provide a low-pressure signal which is compact and not unduly obtrusive when applied to a tire, is certain and accurate in operation, and does not cause any seepage or further loss of pressure when in signalling condition.

Further objects of the invention are to provide such a low-pressure signal in a form which may readily be inserted and substantially entirely confined in a standard tire valve sleeve or casing, and which comprises parts readily interchangeable with the stem or plunger and associated core parts of such a standard valve. Another object accordingly is to provide a compact replacement part for standard tire valve cores which, when fitted in the valve casing, is capable of giving a visual signal when a low-pressure condition exists in the tire.

Other particular objects of the invention are to provide a visual low-pressure signal which normally is contained by and concealed within a tire-valve sleeve so that no bulky and unsightly attachments need be carried around the vehicle wheel, but which has a portion arranged to project beyond the sleeve when the air pressure in the tire falls to a determined value, and in which an air-pressure responsive element is located interiorly of the valve seat to assure accurate response to pressure conditions within the tire, such element being capable of actuating or controlling the projecting signal without unseating the valve or otherwise causing escape of air.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawings, in which:

Fig. 1 is a fragmentary medial vertical sectional view through the upper portion of a signal equipped valve embodying features of the invention;

Fig. 2 is a fragmentary elevation of the upper portion of the device shown in Fig. 1, showing the visual signal in projected position and including a transparent dust cap;

Fig. 3 is a horizontal sectional view taken on line 3—3 of Fig. 1, parts being broken away; and Fig. 4 is a fragmentary medial vertical sectional view through the upper portion of another form of signal equipped valve involving features of the present invention.

Under-inflation is a chief source of excessive tire wear, and the device provided in accordance with this invention is adapted to enable a vehicle operator to avoid such wear by apprising him when the air pressure in his tires is down to or below a critical value. In general the apparatus for doing this comprises a visual signal, which may be red or some other distinctive color, and which is normally held retracted and substantially concealed within the upper end of the tire valve-sleeve, and which is adapted, upon a determined low-pressure condition obtaining within the tire air chamber, to be projected beyond the end of the valve casing where it serves as a visible warning of such low-pressure condition. While the device is especially suitable for tire valves, it obviously is applicable to other pressure indicating service on fluid containing chambers of various types, and it is contemplated that such related uses shall fall within the purview of the claimed invention.

Referring more particularly to the drawings, there is shown an upper portion of a valve sleeve or casing 10 which, in the illustrated and preferred form, is of standard tire valve construction and is adapted to have a standard core fitted therein. In accordance with the present invention such standard core is replaced with the novel signal-equipped unit about to be described.

The outer end of the valve casing 10 is both interiorly and exteriorly threaded and a sleeve 11 is screwed into the interior threads. The sleeve is generally cylindrical and at its lower end carries a valve seat member 12 which is rotatably interlocked with an inturned flange 13 on the sleeve. This valve seat member is encircled by a rubber seating band 14 which is pressed into fluid-tight contact against a restricted throat portion of the valve casing. The valve seat member has an inwardly or interiorly facing annular valve seat 15 adapted to be engaged by the outward face of a valve 16. This seat engaging face of the valve may be of rubber or other suitable sealing material as illustrated.

The valve 16 has a stem 17 extending outwardly therefrom through the valve seat to a point near the outer end of the sleeve 11. The outer end portion of this stem is enlarged at 17a and is of generally cylindrical shape. A signal 18 of hollow thimble shape is telescoped over the upper end 17a of the valve stem and the upper part of the signal is preferably covered with a band or coating of distinctive coloring material 19.

A spring 20 seats between the closed upper end of the thimble-shaped signal and a pocketed seat in the upper end of the valve stem and serves to give the signal a normal bias outwardly into projected warning position. A valve spring 21 seats between the valve seat member and a shoulder on the valve stem and normally urges the latter outwardly so as to hold the outer face of the valve 16 in sealing contact with the valve seat. This also determines the normal position of the outer portion 17a of the valve stem with respect to the outer end of the valve sleeve. The signal 18 is normally held retracted against the bias of the spring 20 by means of an internal annular shoulder 22 confined by a plurality of balls 23 which are preferably three in number and are positioned within radially extending bores 24 which extend inwardly toward the center of the valve stem portion 17a. These balls and the shoulder 22 are so located that the signal, in its retracted position, is substantially concealed within the upper end of the sleeve 11, its outer end being more or less flush with the outer end thereof.

The retaining balls 23 are normally held expanded in their signal retaining position by engagement with the thickened portion of an upper signal controlling or actuating plunger 25, the upper end of which is attenuated and terminates in a thin pin portion 26 which is sildably guided in the valve stem.

Means is provided for lowering the upper plunger 25 with respect to the valve stem when a given pressure condition obtains interiorly of the valve seat 15 so that at such time the thin pin portion 26 is positioned adjacent the balls 23 which then are free to move inwardly and release the shoulder 22 on the signal. This permits the signal to project outwardly under the bias of its spring 20 until the shoulder 22 engages an outwardly facing annular retaining shoulder 27 at the tip of the valve stem portion 17a. The means for thus lowering the upper plunger 25 comprises a spring 28 positioned within a hollow bore in the enlarged portion of the valve stem and seated between such stem and a flange 29 near the lower end of the upper plunger 25. This flange is adapted to be urged downwardly by the spring 28 until it is arrested by contact with a lower face 30 of the plunger spring bore, at which time the thin portion 26 of the upper plunger will be opposite the balls 23. Normally, however, the upper plunger 25 is held in its uppermost position, as shown in Fig. 1, by means of an aligned lower plunger 31 which is slidably mounted within the valve stem 17 and valve 16, its lower end being enlarged as illustrated and shouldered against the valve to prevent undue relative upward movement of the plunger with respect to the valve and stem. The plunger 31 passes entirely through the annular valve seat and through the valve to the inward or interior side of the latter, where it seats against a distensible membrane 32 of rubber or like material. The membrane 32 comprises the closed end of a thimble-shaped member forming part of a pressure responsive device. Side walls 33 of the membrane bearing member are cemented in fluid-tight contact with an inwardly extending boss 16a of the valve. The membrane 32 is normally adapted to hold the plunger 31 in its upward position against the bias of spring 28 by virtue of the pressure exerted on such membrane by the fluid within the tire air chamber. The distensible portion of membrane 32 is of known area which may be determined, for example, by the area of the entire underface of boss 16a, or of a central portion of such boss area, to which the membrane is not cemented. This free or non-cemented pressure responsive area may be and preferably is quite small, say of the order of $\frac{1}{10}$ to $\frac{1}{12}$ inches square, which in a tire under a pressure of approximately two atmospheres or around thirty pounds will receive a pressure of several ounces. The spring 28 is selected to oppose and balance a determined fluid pressure exerted on the membrane 32 and may be selectively interchanged to provide different determined pressure values at which it operates to overcome the pressure on membrane 32 and to force the latter and the plungers downwardly so as to release the retaining balls 23 and permit the signal 18 to project outwardly.

It will thus be seen that if the air pressure within the tire reaches or falls below a critical value, determined by spring 28 in relation to the pressure area of membrane 32, which latter may remain constant, the signal is projected to the warning position. When inflating a tire to remedy the low pressure condition thus indicated, air should be applied in spurts and the signal inspected at the end of each application. When a conventional type of air chuck is applied against the end of sleeve 11, the signal 18 is forced downwardly until its lower end engages an enlargement 17b of the valve stem which in turn is pushed down to unseat the valve 16, it being understood that such chuck has a standard pin element adapted to extend slightly into the valve sleeve to effect this unseating movement. The upper end of the valve stem and its appurtenant signal are fitted somewhat loosely within the valve sleeve, as illustrated, and if desired, it may have flattened sides as shown at 34 (Fig. 3) to facilitate the passage of inflowing air through the valve casing. When the air chuck is released the valve 16 seats and if the pressure within the air chamber exerted upon membrane 32 is adequate, the signal 18 will be held in its retracted position.

A casing tip 35 is threaded over the outward threads on the upper end of the casing 10 and its outer end is flush with the outer end of the sleeve 11, for which it acts as a lock nut. In the illustrated form this tip has a smoothly tapered outward neck over which a transparent dust cap 36 may be frictionally held, such cap preferably being provided with an air vent 37. If the valve is to be used with a hand pump or other type of pump having a threaded air chuck, the tip 35 may be provided with an outwardly threaded neck instead of the one illustrated.

In Fig. 4, another form is illustrated which is generally similar to that described in connection with Figs. 1 to 3 except that a simplified and at present preferred arrangement of the pressure responsive membrane and movement transmitting plunger system is provided in association with the signal valve core. Here, a valve casing 10, which, as in the first form, may be of conventional design, is provided with an internal sleeve 111, the lower portion of which comprises a valve seat member 112 terminating in an interiorly facing annular valve seat 115 adapted to be engaged by the outward face of a valve 116, the seat engaging face of which is preferably of rubber or the like.

The valve 116 has an outwardly extending stem 117 having a hollow bore 38 in its lower or inner portion which passes through the valve seat 115 and to the interior side of the valve where it communicates with the interior of the tire air chamber. This interior end of the bore 38 is preferably covered with a cloth or other mesh screen 39 to keep the bore from clogging.

The upper part of the valve stem 117 near its outer end portion is enlarged as at 117a. A hollow thimble-shaped signal 118 is telescoped over this enlarged end of the valve stem and is normally outwardly biased by a spring 120. A main valve spring 121 is also provided and serves normally to hold the valve in seated position against its valve seat.

Retaining means normally holding the signal 118 retracted against the bias of its spring 120 is provided and comprises an internal annular shoulder 122 confined by a plurality of balls 123, one only of which is shown. These balls are normally held expanded in signal retaining position by engagement with the relatively thick main body portion of a signal controlling or actuating plunger 125, the upper end of which is tapered as illustrated. This plunger is slidably positioned within a hollow chamber in the enlarged stem portion 117a and has near its lower end a spring seat 129, against which a spring 128 rests and normally urges the plunger downwardly or inwardly with respect to the valve stem. The inner end of the plunger 125 rests directly against a pressure responsive membrane 132, which is clamped in position within the enlarged outer end 117 of the valve stem and affords a fluid tight obstacle across the hollow chamber within such enlarged end of the stem. The interior side of this membrane is in communication with valve stem bore 38 and through it with the interior of the tire air chamber.

The pressure responsive area of the membrane 132 and the strength of spring 128 are so selected and correlated that the spring may and does force the membrane downwardly when the pressure within the tire air chamber drops to or below a selected critical value, in which case the plunger 125 moves inwardly with respect to the valve stem until its tapered outer end permits inward movement of the retaining balls 123 and releases the signal for projection to warning position in a manner similar to that described in connection with the first form. The remaining operations, such as reloading the tire after operation of the signal, etc., are also similar to those described in connection with the form shown in Figs. 1 to 3.

It will be understood that certain of the parts, such as the valve stem, which are herein illustrated as being of integral construction for the purpose of convenience, may, for purposes of assembly, be made of separate parts which may be pressed and/or threaded into proper interfitted relation.

The described signal may be provided in the form of a complete valve and such valves may have various signal pop-off values determined by spring 28 or 128 for different kinds of tires requiring different minimum air pressures, or for other types of pressure signalling installations. If desired, the signal unit per se may be supplied for installation in the casing of standard valves from which the conventional core may be removed and replaced by the present improved signal device. The arrangement is always such that the signal is operable without unseating the valve 16, and there is no loss of air due to the signal apparatus since the pressure-responsive device or membrane is sealed to the valve.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A pressure signal and fluid introduction valve structure comprising, in combination, a valve casing in communication with a chamber containing fluid under pressure, cooperating valve and valve seat members in said casing, one of said members being movable relative to the other and biased to engagement therewith to close said casing, a pressure signal located outwardly from said valve and seat members, means to operate said pressure signal to signalling position independent of operation of said movable valve member, a movable pressure responsive device in fluid communication at all times with the interior side of said normally engaged valve and seat members and said chamber, and means to permit operation of said signal operating means when in one position and to prevent such operation when in another position, said pressure responsive device in its movement in response to pressure obtaining in said chamber controlling movement of said last mentioned means from one position to the other.

2. A pressure signal and fluid introduction valve structure comprising, in combination, a valve casing to be mounted in communication with the interior of a chamber adapted to contain fluid under pressure, a valve seat in said casing, a valve normally engaging said seat to close said casing, a pressure signal located outwardly from said valve seat, means to operate said pressure signal to warning position, a movable membrane carried with said valve in a position to be in fluid communication at all times with the interior of the chamber when the device is mounted thereon, latching means to prevent operation of said signal operating means, and releasing means operated by movement of said membrane to release said latching means upon movement of said membrane in response to pressure of a predetermined amount when obtained in the chamber.

3. A low-pressure signal for tires comprising a valve casing in communication with the air chamber of a tire, a valve seat and valve means within said casing for closing it, signal means at the outer end of said casing, and signal actuating means including a pressure responsive device mounted in fluid tight relation on said valve means in communication with the interior of said chamber while the valve means is closed, a spring biasing said signal, a latch preventing movement of said signal, and means movable by said device to release said latch; said signal actuating means being movable with respect to said valve means and operable to actuate said movable means in response to pressure within said chamber while said valve means remains closed.

4. A low-pressure signal for tires comprising a valve casing in communication with the air chamber of the tire, a valve seat and valve means within said casing for closing it, a signal, retaining means holding said signal in retracted position adjacent the outer end of said casing, means biasing said signal for outward movement to warning position, a pressure responsive device mounted on said valve means in communication with the interior of said chamber and movable in response to a determined pressure within said chamber, and means extending from said device to said retaining means to release the latter upon movement of said device.

5. A pressure signal comprising, in combination, a valve casing in communication with a chamber containing fluid under pressure, a valve seat in said casing, a valve normally engaging said seat to close said casing, a pressure signal located outwardly from said valve seat, retaining means for holding said signal in retracted position, means biasing said signal for movement to warning position, a pressure responsive device positioned interiorly of said valve seat, and movement transmitting means extending from said device through said valve and valve seat to said retaining means, means for moving said device when the pressure in said chamber drops to a determined value, said movement transmitting means being arranged to release said retaining means when said pressure responsive device is moved.

6. A pressure signal comprising, in combination, a valve casing in communication with a chamber containing fluid under pressure, a valve seat in said casing, a valve normally engaging said seat to close said casing, a signal, means normally biasing said signal to projected warning position, retaining means for holding said signal in retracted position, a movable pressure responsive membrane carried in fluid tight relation with said valve and in communication with the interior side of said valve, plunger means extending from said retaining means to said membrane, and spring means urging said plunger means for movement against the fluid pressure exerted on said membrane, said plunger means being arranged to release said retaining means when moved by said spring means.

7. A pressure signal comprising, in combination, a valve casing in communication with a chamber containing fluid under pressure, an inwardly facing valve seat in said casing, a valve engageable against said seat having a stem extending outwardly through said valve seat, a signal carried on the outer portion of said stem, means carried by said stem biasing said signal for warning operation, latching and releasing means connected to the biased signal to control its operation, and pressure responsive means carried with said valve and stem operating said releasing means to permit warning operation of said signal in response to a pressure condition obtaining in said chamber.

8. A pressure signal comprising, in combination, a valve casing in communication with a chamber containing fluid under pressure, an inwardly facing valve seat in said casing, a valve engageable against said seat having a stem extending outwardly through said valve seat, a signal biased for movement carried on the outer end of said stem, a movable pressure responsive membrane carried with said valve and stem in communication with the interior side of said valve, signal releasing means mounted on said stem, and plunger means within said stem extending from said membrane to said signal releasing means to effect operation of the signal in response to movement of said membrane.

9. A pressure signal comprising, in combination, a valve casing in communication with a chamber containing fluid under pressure, an inwardly facing valve seat in said casing, a valve engageable against said seat having a stem extending outwardly through said valve seat, a signal telescoped on the outer end of said stem, a spring urging said signal outwardly to warning position, retaining means holding said signal retracted on said stem, a second spring urging said valve against said valve seat, a movable pressure responsive device having fluid communication with the interior side of said valve, plunger means passing through said stem from said retaining means to said device and normally held against movement with respect to said stem by the latter, and spring means urging said plunger means for movement with respect to said stem when permitted by said pressure responsive device, said plunger means being arranged to release said retaining means when so moved.

10. For use in a standard tire valve casing, an insertable core assembly comprising a valve and stem unit including a valve member having inner and outer faces and a stem extending from its outer face, a spring-biased movable signal on the outer end of said stem, a movable pressure responsive device carried on said stem in communication with the inner face of said valve member, a latch engaging between a portion of said signal and said stem, and means carried by said stem slidable relative thereto for transmitting movement between said device and said latch to release said signal to effect operation of the latter.

11. A pressure signal unit adapted for attachment to standard tire valve casings, comprising, in combination, a sleeve carrying an inwardly facing valve seat attachable within the outer end of such casing, a valve and stem unit including a valve engageable against said seat and a stem extending outwardly toward the outer end of said sleeve, a signal movably carried by said stem in position to be projected beyond the outer end of said sleeve, means biasing said signal for projecting movement, latching means preventing projection of said signal, means for releasing said signal, and pressure responsive means carried by said valve and stem unit in communication with the interior side of said valve seat; said pressure responsive means being adapted to operate said releasing means for permitting projecting of said signal in response to pressure obtaining interiorly of said valve seat.

12. A pressure signal unit adapted for attachment to standard tire valve casings, comprising, in combination, a sleeve carrying an inwardly facing valve seat attachable within the outer end of such casing, a valve and stem unit including a valve engageable against said seat and a stem extending outwardly toward the outer end of said sleeve, a signal movably carried by said stem in position to be projected beyond the outer end of said sleeve, means normally urging said valve against said seat, means to move said signal; and signal control means carried by and movable with respect to said valve and stem unit including retaining means to prevent movement of said signal, a pressure responsive device adapted to be at all times in communication with air pressure interiorly of said valve seat, and signal releasing means extending from said device to said retaining means to release the latter upon movement of said device; said signal control means being operable to effect projection of said signal when said air pressure falls to a determined value.

13. A pressure signal comprising, in combination, a valve casing in communication with a chamber containing fluid under pressure, an inwardly facing valve seat in said casing, a valve and stem unit including a valve normally engageable against said seat and a stem passing through said seat outwardly toward the outer end of said sleeve, a signal carried by and movable with respect to said stem in position to be projected beyond the outer end of said sleeve, said valve and stem unit having a passage therein communicating with the interior of said chamber, a pressure responsive device in said passage movable in response to fluid pressure obtaining therein, means for operating said signal, means to prevent operation of said signal, and means to permit operation of said signal operable by movement of said device.

WILLIAM J. HOOPER.